US007596672B1

(12) United States Patent
Gole et al.

(10) Patent No.: US 7,596,672 B1
(45) Date of Patent: Sep. 29, 2009

(54) SYNCHRONOUS MIRRORING INCLUDING WRITING IMAGE UPDATES TO A FILE

(75) Inventors: Abhijeet Gole, Campbell, CA (US); Nitin Muppalaneni, Santa Clara, CA (US); Mark Smith, Cupertino, CA (US); Mike Federwisch, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 336 days.

(21) Appl. No.: 10/692,495

(22) Filed: Oct. 24, 2003

(51) Int. Cl.
*G06F 12/00* (2006.01)
(52) U.S. Cl. ............... 711/170; 711/160; 711/161
(58) Field of Classification Search ............ 714/1; 711/170, 161, 162, 100
See application file for complete search history.

(56) References Cited

U.S. PATENT DOCUMENTS

| 5,636,360 | A | * | 6/1997 | Courts et al. ............ 711/145 |
| 5,687,390 | A | * | 11/1997 | McMillan, Jr. ............ 710/5 |
| 5,787,485 | A | | 7/1998 | Fitzgerald, V et al. |
| 5,870,537 | A | * | 2/1999 | Kern et al. ............ 714/6 |
| 6,178,427 | B1 | | 1/2001 | Parker |
| 6,226,651 | B1 | | 5/2001 | Masuda et al. |
| 6,308,283 | B1 | | 10/2001 | Galipeau et al. |
| 6,499,112 | B1 | * | 12/2002 | Milillo et al. ............ 714/6 |
| 6,502,205 | B1 | * | 12/2002 | Yanai et al. ............ 714/7 |
| 6,516,327 | B1 | * | 2/2003 | Zondervan et al. .......... 707/200 |
| 6,578,160 | B1 | | 6/2003 | MacHardy, Jr. et al. |
| 6,636,879 | B1 | | 10/2003 | Doucette et al. |
| 6,671,705 | B1 | | 12/2003 | Duprey et al. |
| 6,691,245 | B1 | | 2/2004 | DeKoning |
| 6,728,898 | B2 | | 4/2004 | Tremblay et al. |
| 6,735,603 | B2 | | 5/2004 | Cabrera et al. |
| 6,745,303 | B2 | | 6/2004 | Watanabe |
| 7,194,590 | B2 | | 3/2007 | Achiwa et al. |
| 2002/0026603 | A1 | * | 2/2002 | LeCrone et al. ............ 714/6 |
| 2002/0083281 | A1 | | 6/2002 | Carteau |
| 2002/0138705 | A1 | * | 9/2002 | Suzuki et al. ............ 711/162 |
| 2002/0178335 | A1 | | 11/2002 | Selkirk et al. |
| 2002/0194529 | A1 | | 12/2002 | Doucette et al. |
| 2003/0005355 | A1 | * | 1/2003 | Yanai et al. ............ 714/7 |
| 2003/0014433 | A1 | | 1/2003 | Teloh et al. |
| 2003/0084242 | A1 | | 5/2003 | Strange et al. |
| 2003/0167419 | A1 | * | 9/2003 | Yanai et al. ............ 714/7 |
| 2004/0073831 | A1 | * | 4/2004 | Yanai et al. ............ 714/7 |
| 2004/1009863 | | * | 5/2004 | Duncan et al. ............ 714/6 |
| 2004/0153719 | A1 | * | 8/2004 | Achiwa et al. ............ 714/5 |
| 2004/0153736 | A1 | | 8/2004 | Viswanathan et al. |

(Continued)

*Primary Examiner*—Tuan V Thai
*Assistant Examiner*—Thanh D Vo
(74) *Attorney, Agent, or Firm*—Blakely, Sokoloff, Taylor & Zafman LLP

(57) ABSTRACT

A destination storage server, which may be a filer, mirrors a volume managed by a source storage server, which may also be a filer. According to an embodiment of the invention, changes made to the source volume are logged and persistently stored on a data container, such as a file, on the destination volume. The source storage server is coupled to clients that make data access requests to the volume. When an access request is made by a client, the request is written to a log on the source storage server. At the same time, the request is written to a data container on a volume managed by the destination storage server. Each source storage server coupled to the destination storage server has its own file on the volume.

18 Claims, 8 Drawing Sheets

U.S. PATENT DOCUMENTS

| | | | |
|---|---|---|---|
| 2004/0236983 A1* | 11/2004 | Burton et al. | 714/6 |
| 2004/0260970 A1* | 12/2004 | Beardsley et al. | 714/6 |
| 2004/0268177 A1* | 12/2004 | Ji et al. | 714/6 |
| 2005/0010592 A1 | 1/2005 | Guthrie | |
| 2005/0021708 A1 | 1/2005 | Raghuraman et al. | |

* cited by examiner

-- Prior Art --

-- Prior Art --

SYNCHRONOUS MIRRORING INCLUDING WRITING IMAGE UPDATES TO A FILE

FIELD OF THE INVENTION

At least one embodiment of the present invention pertains to networked storage systems, and more particularly, to a method and apparatus for synchronous mirroring by storing volume changes to a file.

BACKGROUND

A file server is a type of storage server which operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the NetApp Filer products made by Network Appliance, Inc. in Sunnyvale, Calif.

A file server can be used to backup data, among other things. One particular type of data backup technique is known as "mirroring". Mirroring involves backing up data stored at a primary site by storing an exact duplicate (an image) of the data at a remote secondary site. The purpose is that, if data is ever lost at the primary site, it can be recovered from the secondary site.

A mirroring arrangement can be established between two filers. A client may be connected to a first filer. The first filer, or source filer, controls the storage of data generated by the client. The client may be, for example, a bank that generates transactions. The transactions are, for example, account debits or credit card charges. The transactions are generally requests issued by the client to modify data stored on, or add data to, a volume managed by the source filer. The volume on the source filer is mirrored on an image volume on the destination filer in order to preserve the transactions for disaster recovery. The destination filer is connected to the source filer over a network. The destination filer is typically at a different physical location from the source filer, so that if the source filer is disabled, the destination filer will not also be disabled by the event which caused the source filer to go down. A destination filer can mirror several source filers, and a source filer can mirror to several destination filers.

A storage server issues a response to a client after a data access request is completed. An asynchronous mirroring relationship updates the volume and the mirrored volume sometime after a response is received by the client making the request. A synchronous mirroring relationship updates the volume and the mirrored volume as the requests are received and before the response is issued to the client. A fully synchronous mirroring relationship transmits every change requested by a client to both the source and the destination filer and updates the image with every change. The synchronous mirroring relationship reduces the likelihood of losing data, however, the network bandwidth required for fully synchronous mirroring is quite high, and will slow down the filers and the network.

Previous mirroring implementations have used destination filers that establish a fixed portion of memory for each source filer the destination filer is mirroring. The portion of memory is used to store incoming write requests from clients attached to the specific source filer, which can then update the image managed by the destination filer. Reserving a specific portion of memory for each source filer does not use the memory on the destination filer to its full potential, because other source filers cannot access those reserved portions of memory.

SUMMARY

The present invention includes a method for mirroring data. In the method, a data access request from a client coupled to a first storage server is received. The access request is then transmitted to a second storage server over a network. When the second storage server receives the access request, the second storage server writes the access request to a file corresponding to the first storage server.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein are methods and apparatuses for synchronous mirroring including writing image updates to a file. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

A destination storage server, which may be a filer, mirrors a volume managed by a source storage server, which may also be a filer. According to an embodiment of the invention, changes made to the source volume are logged and persistently stored on a data container, which may be a file, on the destination volume. The source filer is coupled to clients that make data access requests to the volume. When an access request is made by a client, the request is written to a log on the source filer. At the same time, the request is written to a file on a volume managed by the destination filer. Each source filer coupled to the destination filer has its own set of files on the volume. The log and the file can later be used to update the volume and the mirrored volume in the event of system failure. By writing to a file instead of reserving a portion of memory for each source filer, memory is better utilized.

A filer according to one embodiment of the invention operates in a manner comprising two synchronous operations. A first synchronous operation assures that a request is acknowledged as soon as the request is recorded by both the source and destination filers. A second synchronous operation ensures that the disk images managed by both the source and the destination filers are updated at the same time.

Figure 1:
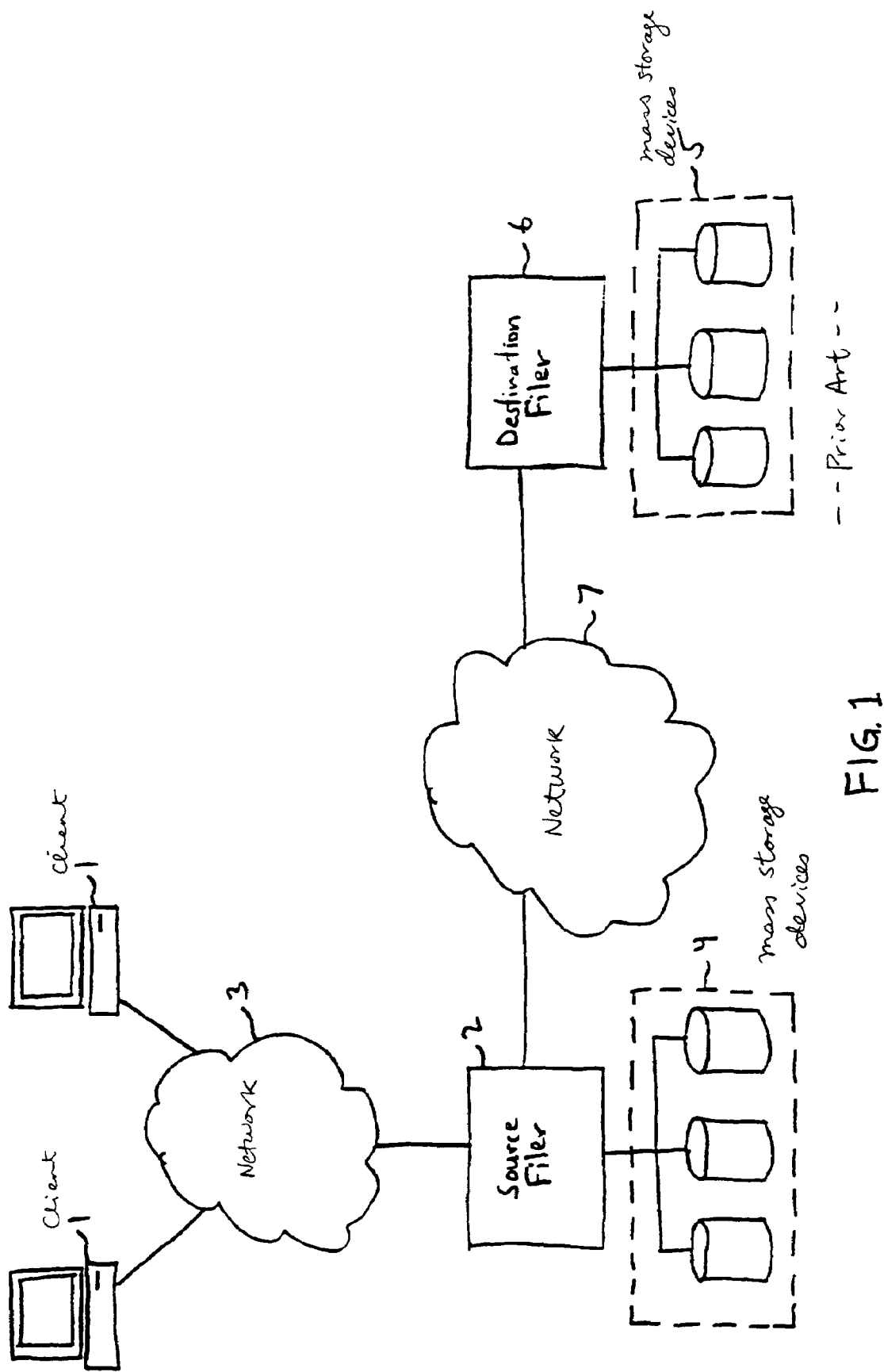
FIG. 1 illustrates an example of a network configuration to facilitate data backup using mirroring.

FIG. 1 illustrates an example of a network configuration to facilitate data backup using mirroring. A number of client processing systems ("clients") 1 are coupled to a filer 2 located at a primary site through a first network 3, such as a LAN. Each of the clients 1 may be, for example, a conventional personal computer (PC), workstation, or the like. The filer 2 provides the clients 1 with access to files stored on a first set of nonvolatile mass storage devices 4, such as magnetic or optical disks, which may be configured as one or more RAID groups. Data stored in mass storage devices 4 is considered to be the primary copy, which is mirrored on a second set of mass storage devices 5 located at a remote secondary site, access to which is controlled by a second filer 6. In this description, the first filer 2 is referred to as the "source filer" 2, while the second filer 6 is referred to as the "destination filer" 6. The source filer 2 and destination filer 6 are coupled to each other through a network 7, such as a WAN.

Note that the configuration of FIG. 1 is a simple one, selected for this description to facilitate explanation of the techniques introduced herein. However, these techniques can also be applied in many other different network configurations. For example, in some alternative configurations, the destination filer 6 may serve a separate set of clients coupled to it. As another example, at least some of mass storage devices 5 may be configured to operate under the direct control of the source filer 2 and/or at least some of mass storage devices 4 may be configured to operate under the direct control of the destination filer 6 (i.e., a cluster-failover configuration). Furthermore, in some configurations, one or more additional filers may be coupled to the source filer 2 and/or to the destination filer 6.

In the illustrated system, write requests are temporarily stored in memory in the source filer 2, and data modified by the requests are saved to mass storage devices 4 from time to time, i.e., at consistency points (CPs). In this approach, there is an inherent (albeit small) risk of losing data modified since the last consistency point if a system failure occurs between consistency points. Consequently, the source filer 2 maintains, in an internal nonvolatile memory, a log of write requests received from clients 1 since the last consistency point. This log is referred to herein as the "NVLog".

The NVLog includes a separate entry for each write request received from a client 1. Each NVLog entry includes the data to be written according to the corresponding request. The NVLog is only used in the event of a failure, to recover data that would otherwise be lost. In the event of a failure, the NVLog is used to reconstruct the current state of stored data just prior to the failure. The NVLog is cleared and started anew after each consistency point is completed.

A separate copy of the NVLog is maintained in the destination filer 6. The copy in the destination filer 6 is created by sending each NVLog entry, at the time the entry is created (i.e., in response to a request), from the source filer 2 to the destination filer 6. Each NVLog entry is sent from the source filer 2 to the destination filer 6 in the form of one or more data transfers from the source filer 2 to the destination filer 6. Upon receiving each NVLog entry from the source filer 2, the destination filer 6 stores the NVLog entry in its main memory and creates a corresponding NVLog entry in its own internal nonvolatile memory. As described further below, data stored in the NVLog may be used to update mirrored volumes managed by a destination filer in the event of a disaster.

Figure 2:
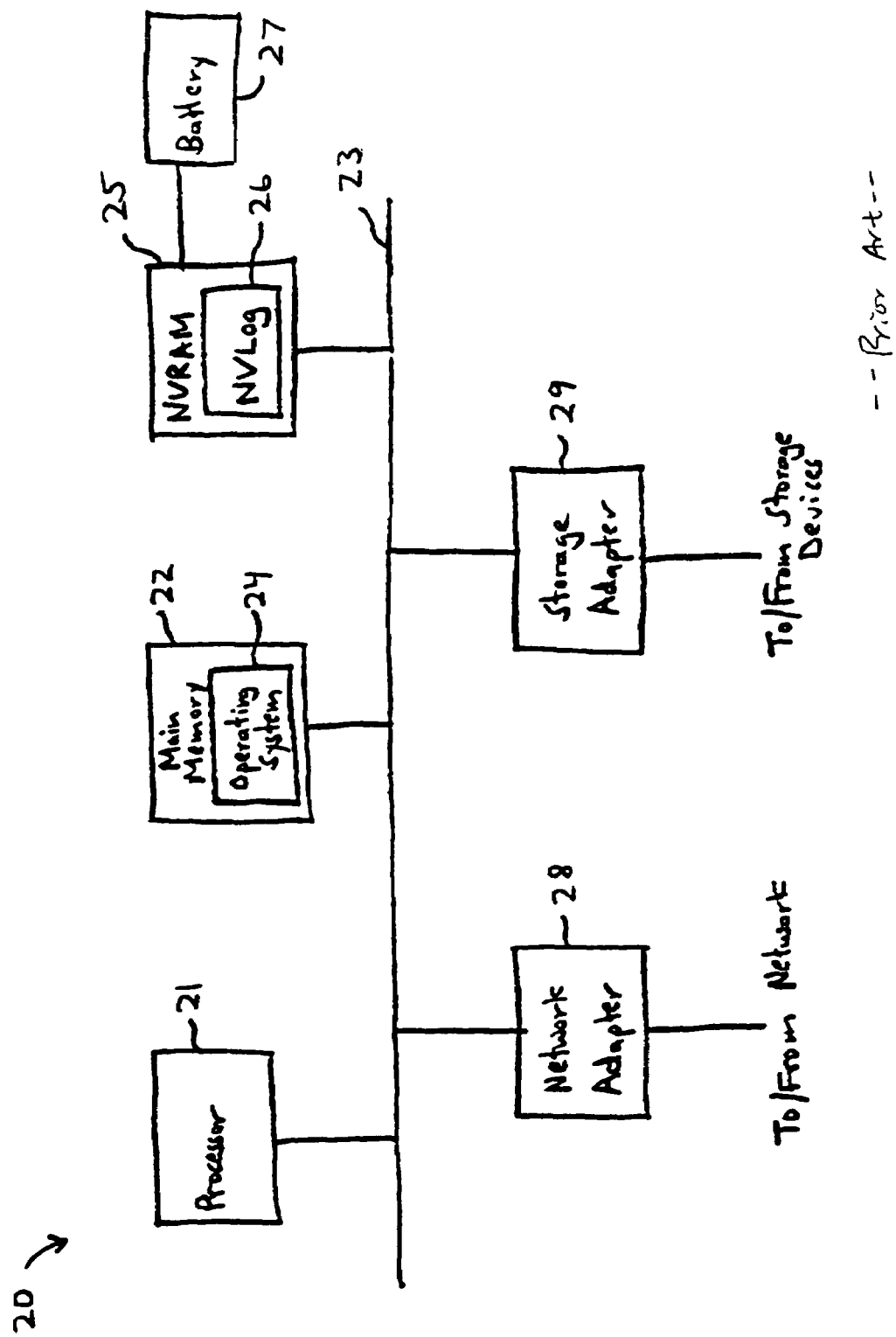
FIG. 2 is a conceptual block diagram of the architecture of a filer.

FIG. 2 shows the architecture of a filer 20, representative of the source filer 2 or the destination filer 6, according to certain embodiments of the invention. Note that certain standard and well-known components which are not germane to the present invention are not shown. The filer 20 includes a processor 21 and main memory 22, coupled together by a bus system 23. The bus system 23 in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 21 is the central processing unit (CPU) of the filer 20 and, thus, controls the overall operation of the filer 20. In certain embodiments, the processor 21 accomplishes this by executing software stored in main memory 22. The processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 22, which is generally some form of random access memory (RAM), stores the operating system 24 of the filer 20. Techniques of the present invention may be implemented within the operating system 24, as described further below. Also coupled to the processor 21 through the bus system 23 is another memory, i.e., a nonvolatile RAM (NVRAM) 25. The NVRAM 25 stores an NVLog 26, such as described above. The NVRAM 25 may be formed by a conventional form of RAM coupled to an uninterruptible backup power source such as a battery 27.

Also connected to the processor 21 through the bus system 23 are a network adapter 28 and a storage adapter 29. The network adapter 28 provides the filer 20 with the ability to communicate with remote devices, such as clients and/or another filer, over a network and may be, for example, an Ethernet adapter. The storage adapter 29 allows the filer to access the external mass storage devices and may be, for example, a Fibre Channel (FC) adapter or SCSI adapter.

Figure 3:
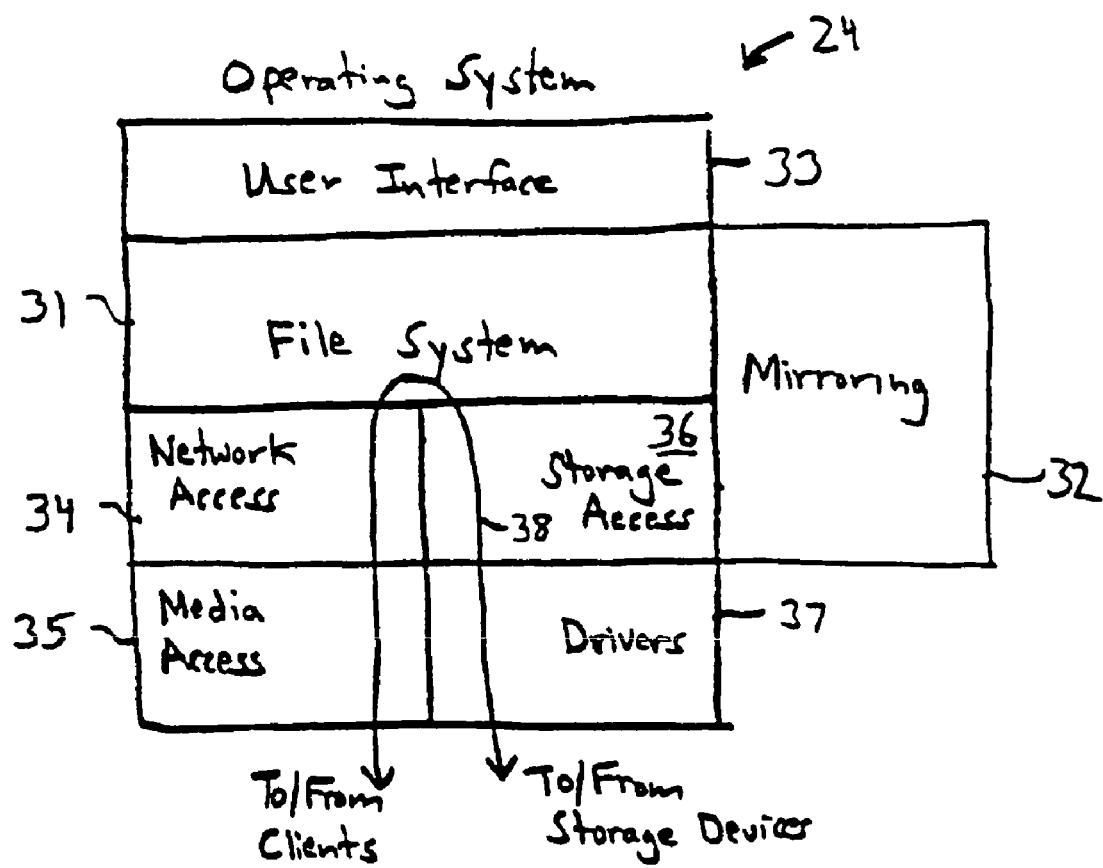
FIG. 3 is a block diagram of the operating system of a filer.

FIG. 3 illustrates the operating system 34 of the filer 20, according to certain embodiments of the invention. As can be seen, the operating system 24 includes a number of layers. The core of the operating system 24 is the file system 31 which, among other responsibilities, executes read and write operations on the mass storage devices in response to client requests, maintains directories, and manages consistency point operations. An example of a file system suitable for this purpose is the Write Anywhere File Layout to (WAFL) file system from Network Appliance, such as used in the NetApp Filers. The file system 31 operates on blocks of data of a predetermined size, such as 4 Kbytes. Also shown in FIG. 3 is the logical data path 38 from clients to mass storage devices, through the file system 31.

Above the file system 31, the operating system 24 also includes a user interface 33, through which a network administrator or other user can control and/or configure the filer (e.g., remotely from a management station). The user interface 33 may generate a command line interface and/or a graphical user interface for this purpose.

Below the file system 31, on the client side the operating system 24 includes a network layer 34 and, at the lowest level, a media access layer 35. The network access layer 34 implements any of various protocols used to communicate with client devices, such as network file system (NFS), common Internet file system (CIFS) and/or hypertext transport protocol (HTTP). The media access layer 35 includes one or more drivers which implemented the protocols used to communicate over the network, such as Ethernet.

Below the file system 31 on the storage device side, the operating system 24 includes a storage access layer 36 and, at the lowest level, a driver layer 37. The storage access layer 36 implements a disk storage protocol such as RAID, while the driver layer 37 implements a lower-level storage device access protocol, such as Fibre Channel or SCSI.

The operating system of 24 also includes a mirroring module 32, which is operatively coupled to the file system 31 and the storage access layer 36. The mirroring module 32 controls the synchronization of data at the remote secondary site with data stored at the primary site. The techniques introduced herein may be implemented at least partially using the mirroring module 32.

Destination filers according to one embodiment have a memory that stores an NVLog (nonvolatile log of data access requests). The NVLog may be stored in the NVRAM 25, for example. The NVLog on the destination filer receives data access requests from the source filer. According to a previous implementation, the memory is partitioned into roughly equal portions for each filer that is attached to a specific destination filer. Another portion of the memory was reserved for clients of the destination filer. This is an inefficient arrangement, since having a dedicated portion of memory for a specific source filer that may not constantly be accessing that memory guarantees that certain portions of the memory will always be empty and not fully utilized. Therefore, what is needed is a method and apparatus for better utilizing the memory on the destination filer.

Figure 4:
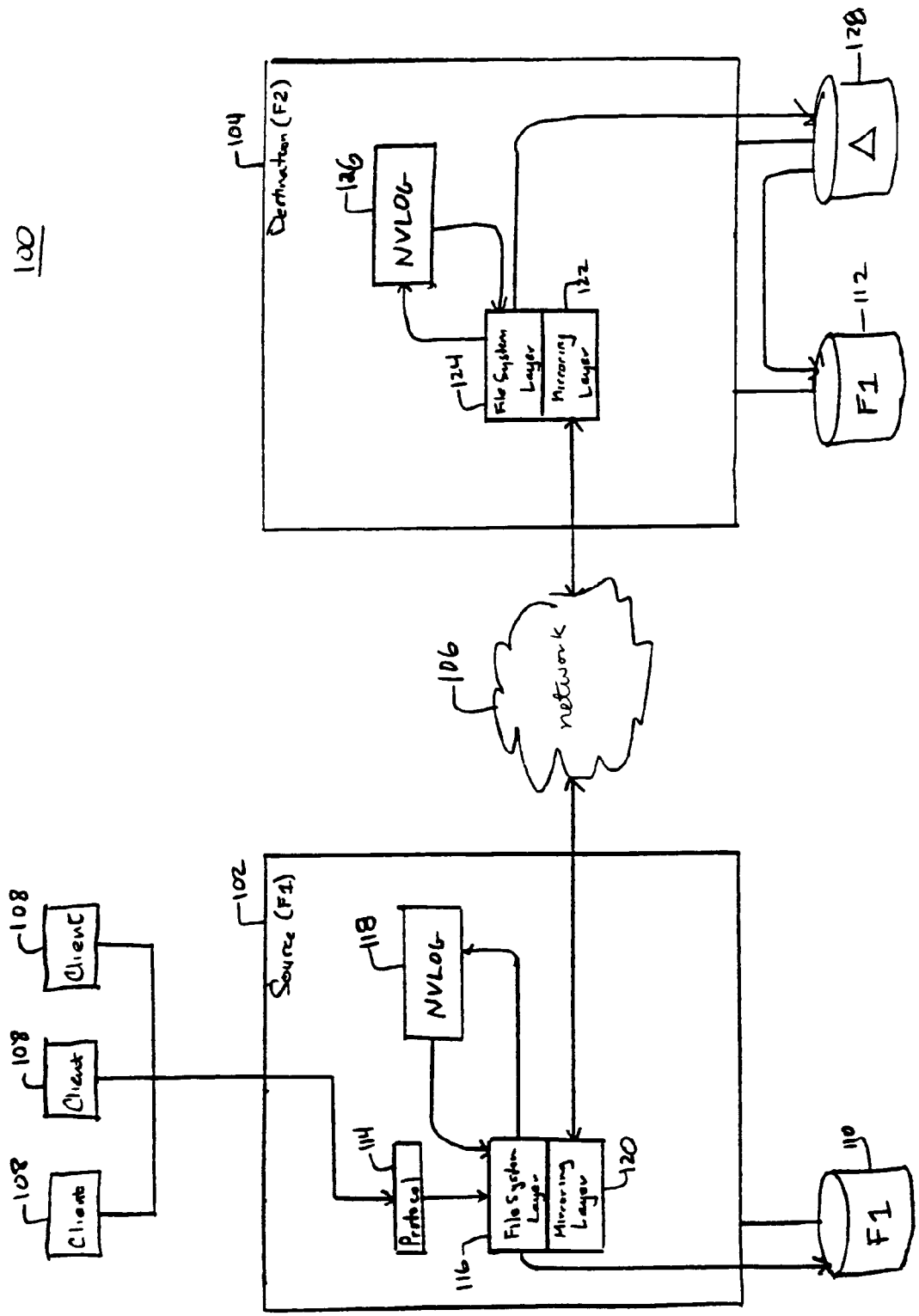
FIG. 4 illustrates a mirroring relationship between a source and destination filer.

FIG. 4 illustrates a mirroring relationship between a source and destination filer. The source filer 102 is connected to a destination filer 104 over a network 106. The network 106 may be a Transmission Control Protocol/Internet Protocol (TCP/IP), FC, etc. network. The source filer 102 stores changes made by client 108 to update a volume 110. The source filer 102 may be, for example, a bank filer, to record credit card transactions. The transactions will be made in a credit card terminal such as client 108, and stored on a volume 110 which may be an array of disks such as a RAID. The destination filer 104 may be at a remote location, and can be accessed over the network 106. If the source filer 102 fails, the destination filer 104 can assume the functionality of the source filer 102, or can restore the volume 110 using an NVLog stored on the destination filer 104.

When a client 108 makes a data access request to the source filer 102, the access request is first sent into a protocol layer 114, which forwards the request to a file system layer 116. The protocol layer 114 may be the network access layer 34 described in FIG. 3. The file system layer 116 may incorporate a file system such as the file system 31. The file system layer 116 then sends the access request to an NVLog 118. A data access request is written to the NVLog 118, and at a later time, known as a consistency point (CP), the same changes that were written to the NVLog 118 are applied to the system volume 110 through the file system layer 116.

The file system layer 116 includes a mirroring layer 120. The mirroring layer 120 is a component added to the file system layer 116 to enable mirroring. The mirroring layer 120 forwards the data access requests to the destination filer 104 as soon as they arrive. When the mirroring layer 120 forwards the data access requests over the network 106, the destination filer 104 receives the requests in its own mirroring layer 122. The mirroring layer 122 on the destination filer 104 is added to the destination filer's file system layer 124. When the file system layer 124 on the destination filer 104 receives the data access request, the data access request is written to a file on the destination filer 104. When a disaster occurs, the data in the file is used to update the mirrored volume 112. In one embodiment, the data access requests received by the destination filer 104 are written to a volume 128 which stores the changes on a non-volatile mass storage device such as a disk or a disk array.

When a data access request is received at the destination, the mirroring layer 120 writes the request to a file. The file system layer 124 writes the request to the NVLog 126 when it processes that file write request. Prior implementations of receiving volume updates partitioned NVRAM in the destination filer 104 into several partitions, one for each source filer 102. Using the techniques introduced herein, a file of NVLog entries is written at the destination for each source filer 102, rather than partitioning NVRAM in the destination filer 104. In this way, the entire NVRAM in the destination filer 104 can be utilized. The file of NVLog entries on the volume 128 can then be used to update the volume 110 and the mirrored volume 112 in the event of a system failure.

Note that while files are implemented in an illustrative embodiment, the term "file" should be taken broadly to include any type of data organization or "data container," including those used by block level protocols, such as SCSI. The term "data container" will therefore be used interchangeably for files herein. As used herein, a file is a programmatic entity that imposes structure on the address space of one or more physical or virtual disks so that the storage operating system may conveniently deal with data containers, including files.

Figure 5:
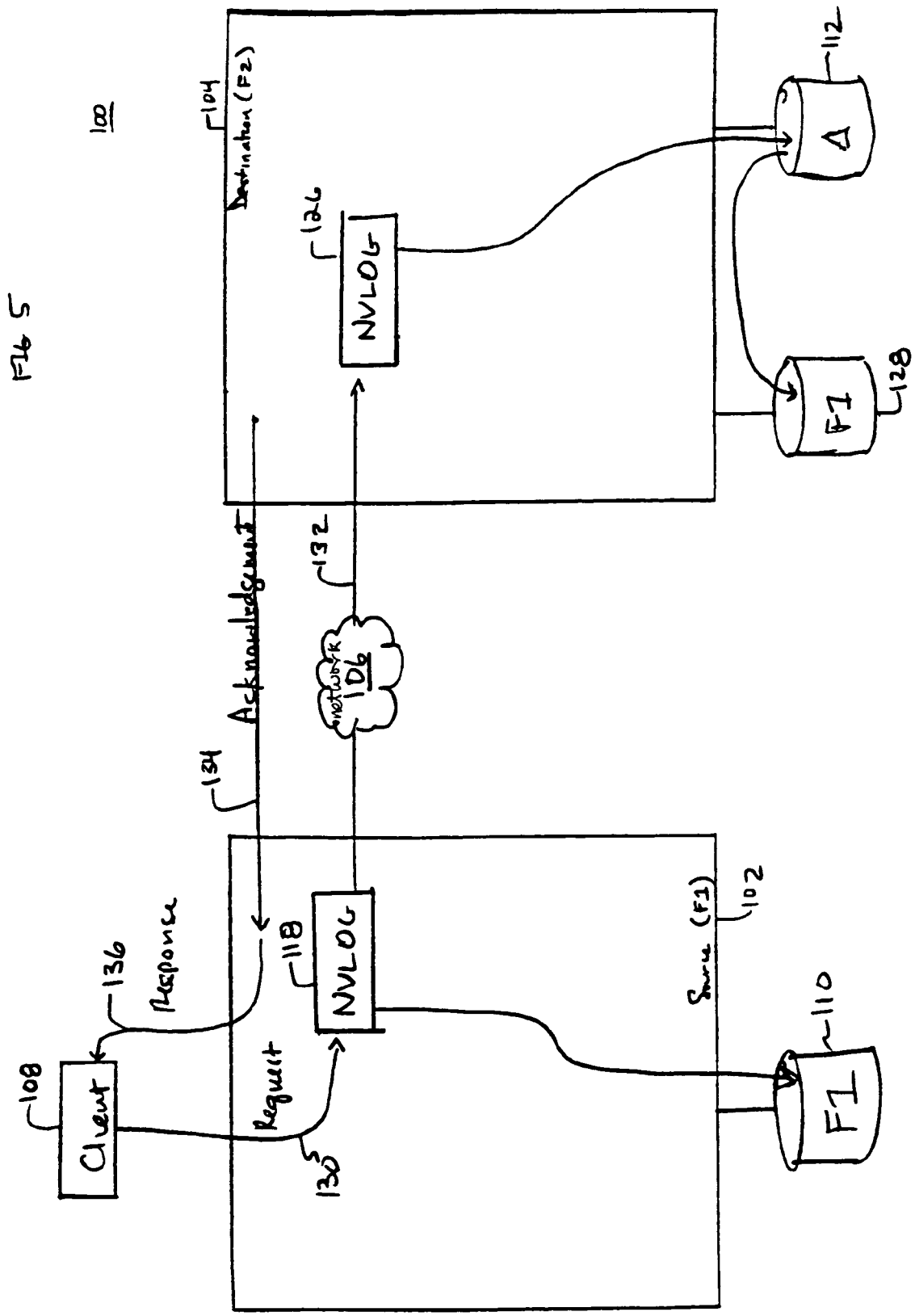
FIG. 5 illustrates the functional relationship between a source filer that is mirrored to a destination filer.

FIG. 5 shows the functional relationship between the source filer 102 and the destination filer 104 for mirroring. When a client 108 makes a request to modify the data stored on the volume 110, the request 130 is initially sent to the NVLog 118 through the file system layer 116. The mirroring layer 120 then orders a network transfer 132 over a TCP/IP or other network 106 to send the data to the NVLog 126 on the destination filer 104. Once the NVLog 126 receives the network access request, the destination filer 104 issues an acknowledgement 134 to the source filer 102. Once the source filer 102 receives the acknowledgment 134, the source filer 102 issues a response 136 to the client 108. The response 136 informs the client that the data access request has been stored safely on both the source and the destination. The response 136 is typically required by the client 108 to continue operations without an error. If a response is not received, for example, the source filer 102 may need to begin accessing another destination filer.

Consistency points (CPs) are executed by the source filer 102 at predetermined intervals or when an NVLog partition is full. When a CP is ordered, the data access requests stored in memory will update the volume 110. At the same time the source filer 102 issues the CP request, the destination filer 104 also updates the volume 112. The volumes 110 and 112 should be updated at the same time using the same data, so that they are true mirrors of each other. That is why the destination filer 104 will update the destination volume following the CPs ordered by the source filer 102. Once the mirrored volume 112 has been updated, the files on the volume 128 may be discarded or overwritten.

Figure 6:
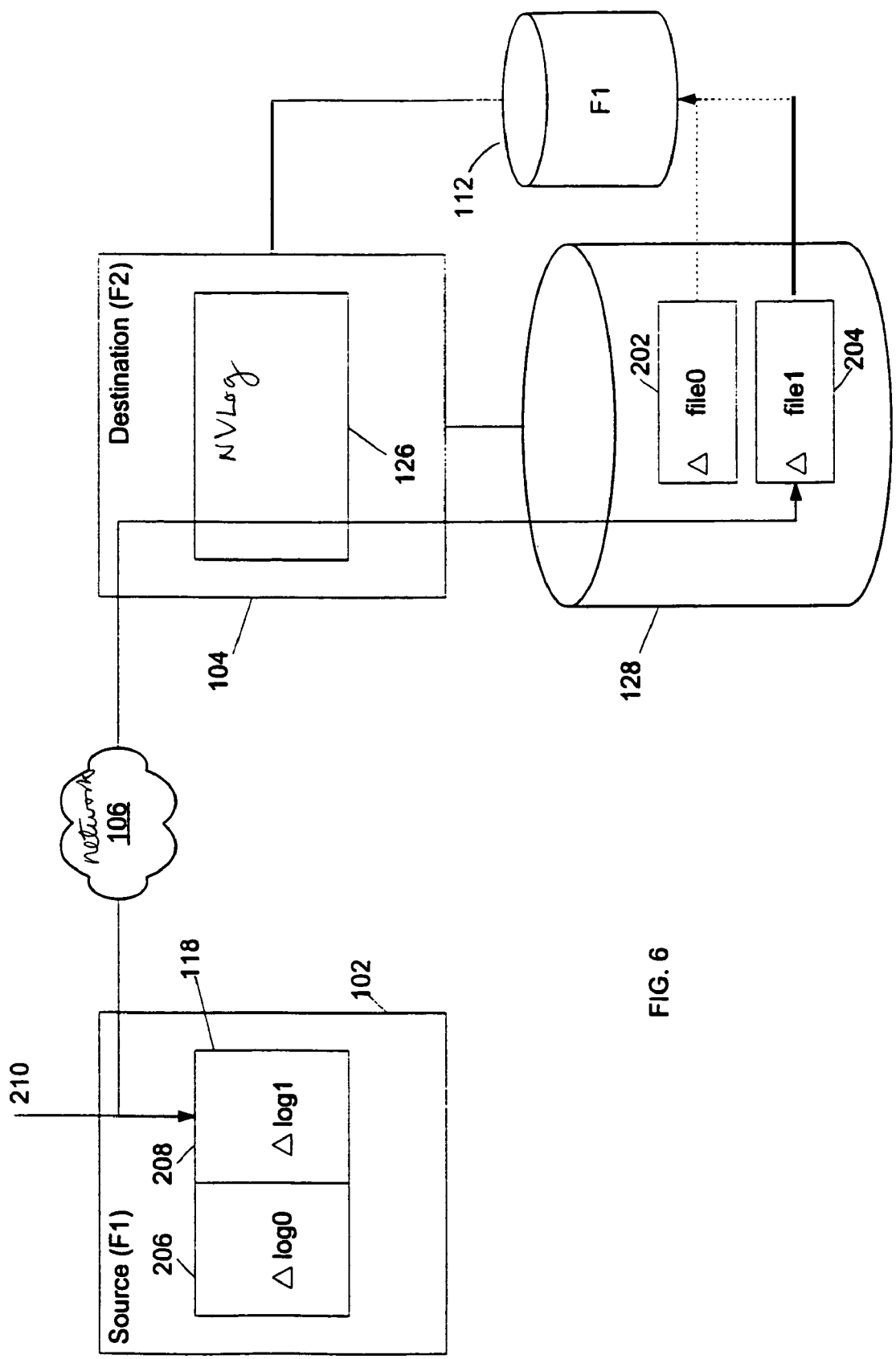
FIG. 6 illustrates a relationship between a source NVLog and a destination volume.

FIG. 6 illustrates a relationship between a source NVLog and a destination volume. The mirroring layer 122 on the destination filer 104 receives incoming requests and writes them into files. A property of the file system layer 124 is that when a file is written, it will first be written to the NVLog 126 and later to the volume 128. The volume 128 stores two files 202 and 204. The NVLog 118 is partitioned into two partitions 206 and 208. The partition 206 corresponds to the file 202 on the volume 128 and the partition 208 corresponds to the file 204 on the volume 128. The first partition 206 is known as the • log 0 partition, and the second partition 208 is known as the • log 1 partition. The partitions are known as '• log' partitions because they log the changes to be made to the mirrored volume. Likewise the files 202 and 204 are known as '• file' because they are files containing changes to the mirrored volume.

An incoming request 210 is currently being written to the partition 208. When incoming requests 210 are written to the NVLog 118, the requests 210 are written to the partition 208 until it is full. At the same time, the request 210 is being written into a file 204. The requests 210 are sent over the network 106 by the mirroring layer 120, are then received by the mirroring layer 122 on the destination filer 104, and written to the file 204 on the volume 128 through the file system layer 124. When the partition 208 is full, a CP is issued on the source filer 102, and the requests are applied to the volume 110 managed by the source filer 102 and the image volume 112 managed by the destination filer 104. The image volume 112 can be updated using the requests stored in the files 202 and 204, data sent by the source filer 102, or a combination of the two. Once the CP is issued, the other partition, here partition 206, begins receiving requests.

Several source filers may write to the destination filer 104 at the same time. All of the incoming requests are stored in a different file corresponding to the source filer from which they came. Each source filer maintains two files on the volume 128. One file for each source filer corresponds to the requests written into the • log 0 portion 206 of the NVLog 118, and the other file corresponds to the requests written into the • log 1 portion 208 of the NVLog 118.

According to an additional embodiment of the invention, the destination filer 104 ensures that the requests are written in the same order to the file 204 as they were in when they are received by the source filer 102. A sequence number is assigned to each request, and the file system layer 124 on the destination filer 104 uses the sequence number to ensure that the requests are sent to modify the image 112 in the correct order.

Figure 7:
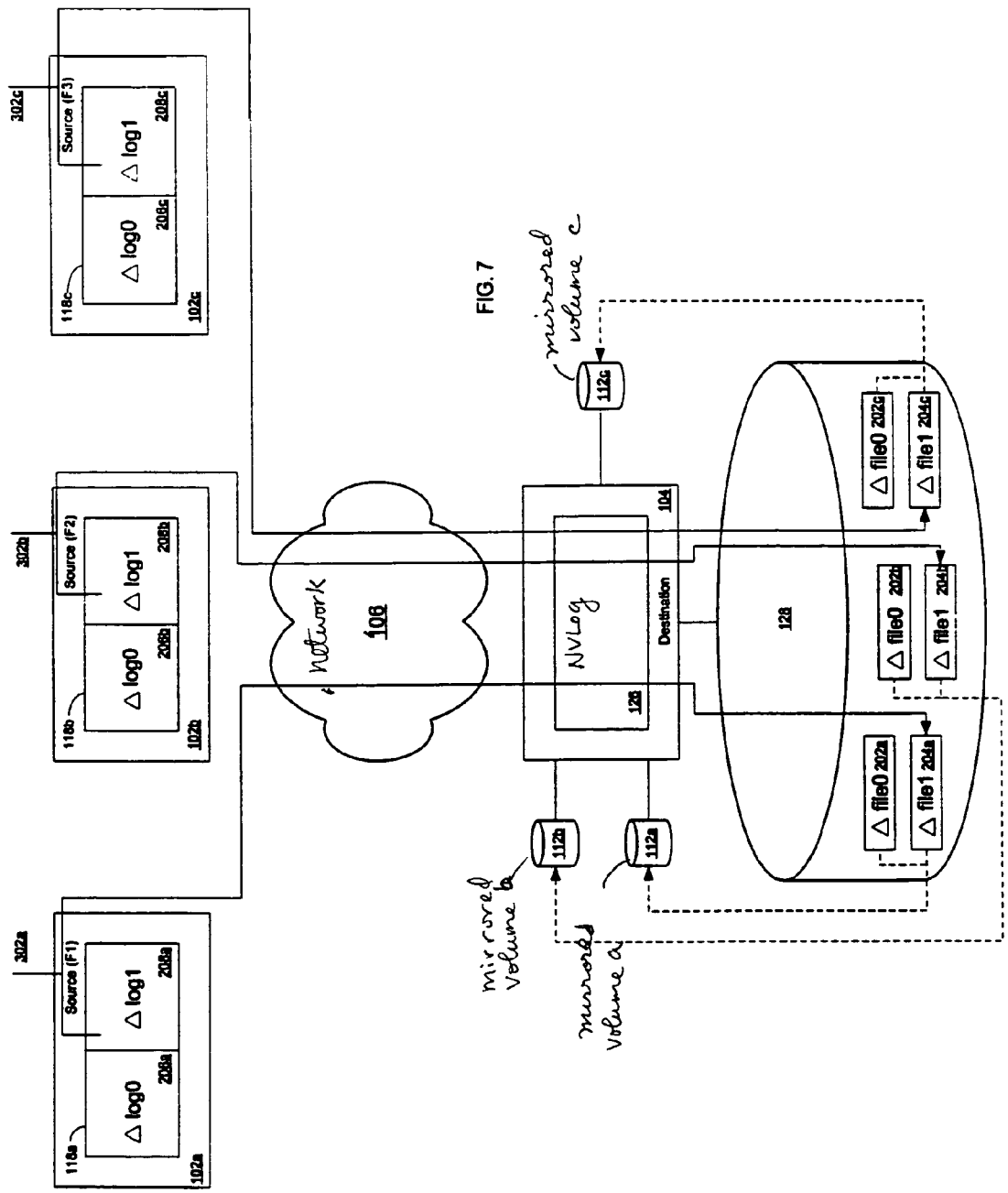
FIG. 7 illustrates a destination filer receiving requests from multiple source filers.

FIG. 7 illustrates a destination filer receiving requests from multiple source filers. Three filers F1 102*a*, F2 102*b*, and F3 102*c* send update requests to a single destination filer 104. Each of the three filers 102*a-c* maintains a separate mirrored volume 112*a-c*, respectively, on the destination filer 104. When each source filer 102*a-c* receives a data access request, such as the requests 302*a-c*, the requests 302*a-c* are written to the • log 1 partitions 208*a-c* and to a corresponding file 204*a-c* at the same time. When the destination filer 104 receives the requests 302*a-c*, the file system layer 124 writes the files 204*a-c* first to the NVLog 126. In FIG. 7, the requests 302*a-c* are shown written into the • log 1 partitions 208*a-c*. When the • log 1 partitions 208*a-c* are full, the subsequent incoming requests are written to the • log 0 partitions 206*a-c*, as well as to the files 202*a-c*. When the • log 1 partitions 208*a-c* are full, the destination filer 104 orders a CP, and the data in the files 204*a-c*, data sent from the source filers, or a combination of the two are used to update the images 112*a-c*. The source filers 102*a-c* may also issue CPs at any time deemed necessary.

The • file 1 files 204*a-c*, and the • file 0 files 202*a-c* are used to update the mirrored volumes 112*a-c*. Each source filer F1, F2, and F3 has two files that are written on the volume 128. The volume 128 stores a file for each partition of the NVLogs 118*a-c*. These files can then used to update the image volumes 112*a-c*. During a CP, the source filers 102*a-c* may also send data to the destination filer 104 to update the images 112*a-c*. This data may be used in place of, or in conjunction with, the requests stored in the log filers 202*a-c* and 204*a-c*. Previously, the NVLog 126 was divided into several partitions: one for clients coupled to the filer, and one each for every source filer. By writing the requests to a file, the filer uses the file system layer 124 to more fully use the NVLog 126.

Figure 8:
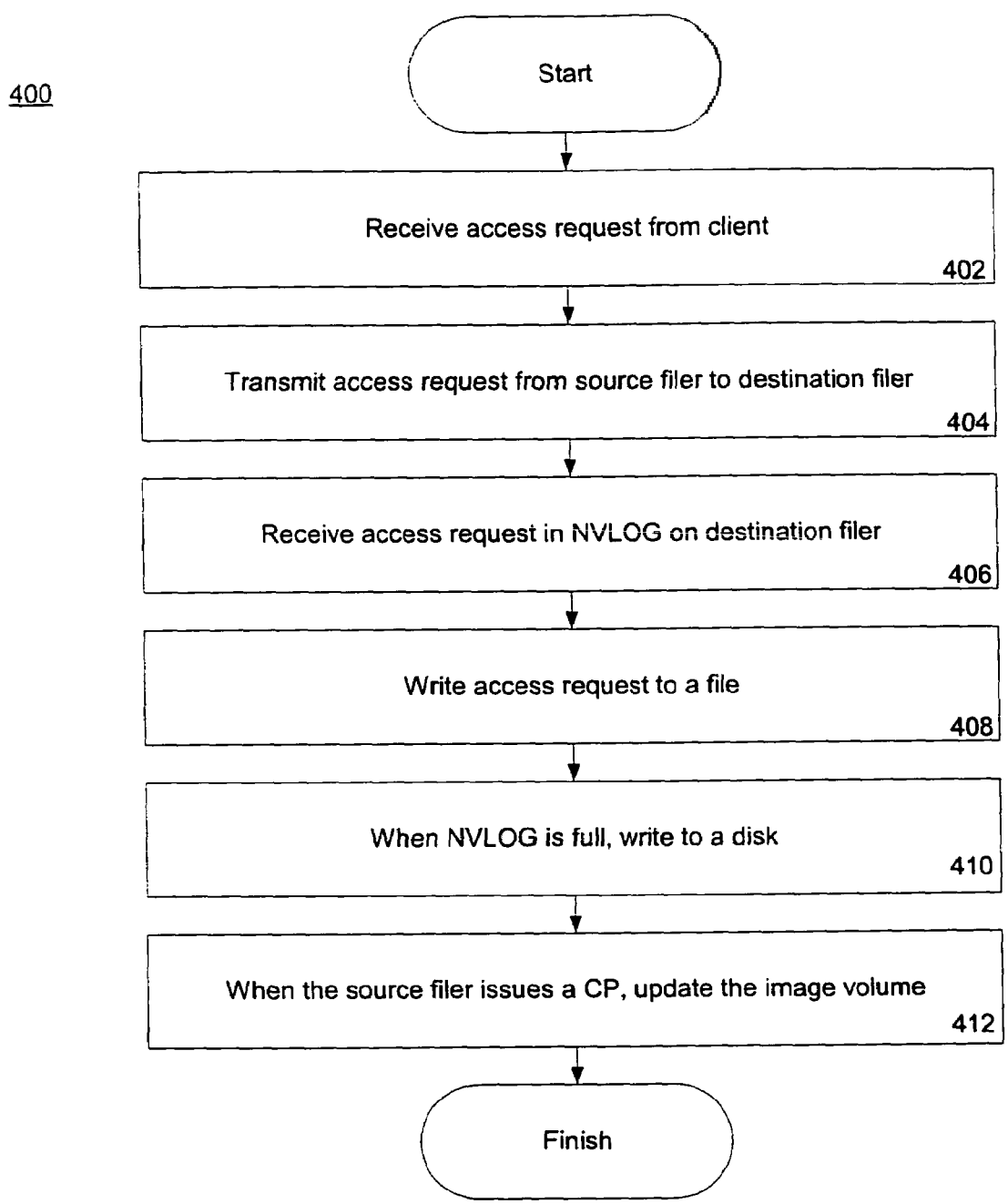
FIG. 8 is a flow chart illustrating a process for writing data access requests to file.

FIG. 8 is a flow chart illustrating a process for writing data access requests to file. The process 400 generally includes the process of mirroring a client request on a source filer to a destination filer. In block 402, a source filer receives a data access request from a client. The data access request is a request to add or modify data on a volume coupled to the source filer. In block 404, the data access request is transmitted from the source filer to a destination filer. The data access request is transmitted over a network, which may be a TCP/IP network, a Fibre Channel (FC) network, etc.

In block 406, the access request is received by the mirroring layer on the destination filer. The access request is sent by a mirroring layer on the source filer and is received by a mirroring layer on the destination filer. The mirroring layer on the destination filer receives the access request and, through a file system layer on the destination filer, writes the access request to a file in block 408. In block 410, when the NVLog is full, the access request is written to a disk, such as a RAID volume, or other persistent mass memory.

In block 412, the source filer orders a CP. When the CP is ordered on the source filer, the source image on the destination filer is updated using the log files for that specific source filer. The destination filer may also use data sent directly by the source filer during the CP to update the image. The destination filer may use the log files exclusively, data sent by the source filer exclusively, or some combination of both to update the image. After the source image is updated, the log files are empty, and ready to receive new requests from the source filer.

The techniques introduced above have been described in the context of a NAS environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

This invention has been described with reference to specific exemplary embodiments thereof. It will, however, be evident to persons having the benefit of this disclosure that various modifications changes may be made to these embodiments without departing from the broader spirit and scope of the invention. The specification and drawings are accordingly to be regarded in an illustrative rather than in a restrictive sense.

What is claimed is:

1. A method for mirroring data comprising:

receiving at a first storage server a data access request from a client coupled to the first storage server;

writing the data access request to a first non-volatile log in a first non-volatile random access memory in the first storage server, to prevent a loss of the data access request;

transmitting the data access request from the first storage server to a second storage server, wherein the second storage server writes the data access request to a second non-volatile log in a second non-volatile random access memory in the second storage server and into a file stored in a mass storage device managed by the second storage server; and when the first non-volatile log in the first storage server becomes full, writing the data access request stored in the first non-volatile log to a first volume managed by the first storage server, and causing the second storage server to write the data access request stored in the file to a second volume managed by the second storage server, wherein the second volume is an image volume of the first volume, wherein the second storage server uses the file to recover data in the image volume if a disaster occurs.

2. The method of claim 1, further comprising:

sending a synchronization request to the second storage server from the first storage server when the first non-volatile log in the first storage server becomes full.

3. The method of claim 1, further comprising:

sending an acknowledgement from the second storage server to the first storage server in response to receiving the data access request to cause the first storage server to send a response to the client after the data access request has been stored on the first storage server and stored in the mass storage device managed by the second storage server.

4. The method of claim 1, wherein the file is associated with the first non-volatile log in the first storage server.

5. The method of claim 1, wherein the data access request is transmitted from the first storage server to the second storage server over a network.

6. The method of claim 1, further comprising:

assigning a sequence number to the data access request, wherein the sequence number designates a position of the data access request in a group of data access requests to ensure that the data access request is properly ordered within the file.

7. An apparatus comprising:

a destination storage server to mirror data stored by a source storage server;

a network interface in the destination storage server, the network interface coupled to the source storage server, the network interface to receive a data access request from a client coupled to the source storage server, wherein the source storage server has written the data access request to a first non-volatile log in a first non-volatile random access memory in the source storage server to prevent a loss of the data access request, wherein the destination storage server is configured to write the data access request to a second non-volatile log in a second non-volatile random access memory in the destination storage server and to a file corresponding to the source storage server; and a mass storage device, managed by the destination storage server, to store the file, wherein the data access request is written to the mass storage device in response to the first non-volatile log in the source storage server becoming full, wherein the destination storage server uses the file to recover data in the nonvolatile mass storage device when a disaster occurs.

8. The apparatus of claim 7, wherein the network comprises a Transmission Control Protocol/Internet Protocol (TCP/IP) network.

9. The apparatus of claim 7, wherein the destination storage server modifies an image of a volume, said volume maintained by the source storage server, according to the data access request when the source storage server makes a synchronization request, wherein the image of the volume is in the non-volatile mass storage device managed by the destination storage server.

10. A method comprising:

receiving a data access request at a destination filer from a first source filer, wherein the data access request is written to a first portion of a first nonvolatile random access memory in the source filer;

sending an acknowledgement to the first source filer in response to the destination filer receiving the data access request;

writing the data access request to a second nonvolatile random access memory in the destination filer;

transferring the data access request from the second nonvolatile random access memory to a first file, corresponding to the first source filer, on a mass storage device managed by the destination filer;

removing the data access request from the second nonvolatile random access memory after transferring the data access request to the first file;

applying the data access request in the first file to an image of a volume in response to a specified signal from the first source filer indicating that the first portion of the first nonvolatile random access memory is full, wherein the volume is maintained by the first source filer and the image is maintained by the destination filer, wherein the destination storage server uses the first file to recover data in the image of the volume if a disaster occurs;

receiving a second data access request from a second source filer, wherein the second data access request is written to a third nonvolatile random access memory in the second source filer;

sending a second acknowledgement to the second source filer in response to the destination filer receiving the second data access request;

writing the second data access request to the second nonvolatile random access memory in the destination filer;

transferring the second data access request from the second nonvolatile random access memory to a second file on the mass storage device managed by the destination filer, the second file associated with the second source filer; and removing the second data access request from the second nonvolatile random access memory after transferring the second access request to the second file.

11. The method of claim 10, further comprising connecting the second source filer to the client in response to a system failure.

12. The method of claim 10, further comprising:

allowing the client to access the image.

13. A method of mirroring data, the method comprising:

operating a destination storage server to maintain a plurality of mirror volumes in a non-volatile mass storage subsystem, wherein each mirror volume mirrors a corresponding one of a plurality of source volumes maintained by a plurality of source storage servers that are coupled to communicate with the destination storage server;

receiving, at the destination storage server, write requests from the plurality of source storage servers, each said write request corresponding to a write request received by one of the plurality of source storage servers from a storage client for updating one of the plurality of source volumes;

operating the destination storage server to store the write requests temporarily prior to synchronizing the plurality of mirror volumes with the plurality of source volumes, including storing a non-volatile log of the write requests received by the destination storage server from the plurality of source storage servers in a non-volatile random access memory in the destination storage server, using the destination storage server to maintain a plurality of files in a non-volatile mass storage subsystem, each said file corresponding to a separate one of the plurality of source storage servers, and storing each write request received by the destination storage server from a source storage server in one of said files, which corresponds to said source storage server; and in response to receiving a specified signal from the source storage server, operating the destination storage server to synchronize the plurality of mirror volumes with the plurality of source volumes based on the write requests received from the plurality of source storage servers, wherein each of the source storage servers maintains a separate non-volatile log of write requests from storage clients in a partitioned non-volatile random access memory, and wherein the specified signal from the source storage server corresponds to a partition becoming full in the partitioned non-volatile random access memory in the source storage servers.

14. A method as recited in claim 13, wherein each partition of the partitioned non-volatile random access memory in each of the source storage servers corresponds to a distinct one of the plurality of files in the non-volatile mass storage subsystem.

15. A method for mirroring data comprising:

receiving at a source storage server a data access request from a client coupled to the source storage server;

writing the data access request to a first non-volatile log in a first non-volatile random access memory in the source storage server to prevent a loss of the data access request;

transmitting the data access request from the source storage server to a destination storage server, wherein the destination storage server writes the data access request into a second non-volatile log in a second non-volatile random access memory in the destination storage server and a file stored in a mass storage device managed by the destination storage server; and when the first non-volatile log in the source storage server becomes full, transmitting the data access request in the first non-volatile log to a first volume managed by the source storage server, to cause the first volume to be updated according to the data access request, and causing the destination storage server to transmit the data access request in the file to a second volume managed by the destination storage server, wherein the second volume is an image volume of the first volume, to cause the image volume to be updated according to the data access request.

16. The method of claim 15, wherein the file is associated with the first non-volatile log in the source storage server.

17. The method of claim 15, wherein the mass storage device comprises a disk.

18. The method of claim 15, further comprising:

assigning a sequence number to the data access request, wherein the sequence number designates a position of the data access request in a group of data access requests to ensure that the data access request is properly ordered within the file.

* * * * *